United States Patent
Zhang et al.

(10) Patent No.: US 9,998,727 B2
(45) Date of Patent: Jun. 12, 2018

(54) ADVANCED INTER-VIEW RESIDUAL PREDICTION IN MULTIVIEW OR 3-DIMENSIONAL VIDEO CODING

(71) Applicant: QUALCOMM Incorporated, San Diego, CA (US)

(72) Inventors: Li Zhang, San Diego, CA (US); Ying Chen, San Diego, CA (US); Xiang Li, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 794 days.

(21) Appl. No.: 14/029,696

(22) Filed: Sep. 17, 2013

(65) Prior Publication Data
US 2014/0078250 A1    Mar. 20, 2014

Related U.S. Application Data

(60) Provisional application No. 61/703,211, filed on Sep. 19, 2012.

(51) Int. Cl.
*H04N 13/00* (2018.01)
*H04N 19/597* (2014.01)
(Continued)

(52) U.S. Cl.
CPC ....... *H04N 13/0048* (2013.01); *H04N 19/105* (2014.11); *H04N 19/139* (2014.11);
(Continued)

(58) Field of Classification Search
CPC ................................................ H04N 13/0048
(Continued)

(56) References Cited

U.S. PATENT DOCUMENTS

2010/0111183 A1* 5/2010 Jeon ..................... H04N 19/597
375/240.16
2010/0284466 A1* 11/2010 Pandit .................. H04N 19/597
375/240.16
(Continued)

FOREIGN PATENT DOCUMENTS

CN        101292538 A      10/2008
WO    WO-2009020542 A1      2/2009
(Continued)

OTHER PUBLICATIONS

Ellinas J N, et al., "Stereo video coding based on quad-tree decomposition of B-P frames by motion and disparity interpolation" IEE Proceedings: Vision, Image and Signal Processing, Institution of Electrical Engineers, GB LNKDDOI: 10.1049/IP-VIS:20045033, vol. 152, No. 5, Oct. 7, 2005 (Oct. 7, 2005), pp. 639-647, XP006024995 ISSN: 1350-245X p. 642, paragraph 3.2—p. 643.

(Continued)

*Primary Examiner* — Jonathan Messmore
(74) *Attorney, Agent, or Firm* — Knobbe, Martens, Olson & Bear, LLP

(57) ABSTRACT

Systems and methods for coding video information for a current view based on a residual prediction from video information for a reference view are described. In one innovative aspect, an apparatus for coding digital video is provided. The apparatus includes a memory configured to store current view video information and reference view video information. The apparatus also includes a processor configured to determine a value of a current video unit of the current view based at least on a motion compensated block of the reference view. The motion compensated block may be determined based at least in part on motion information and a disparity vector associated with the current video unit.

(Continued)

Decoding devices and methods as well as corresponding encoding devices and methods are described.

43 Claims, 9 Drawing Sheets

(51) Int. Cl.
*H04N 19/105* (2014.01)
*H04N 19/139* (2014.01)
*H04N 19/176* (2014.01)
*H04N 19/463* (2014.01)
*H04N 19/70* (2014.01)
*H04N 19/147* (2014.01)

(52) U.S. Cl.
CPC ......... *H04N 19/176* (2014.11); *H04N 19/463* (2014.11); *H04N 19/597* (2014.11); *H04N 19/147* (2014.11); *H04N 19/70* (2014.11)

(58) Field of Classification Search
USPC .......................................................... 348/43
See application file for complete search history.

(56) References Cited

U.S. PATENT DOCUMENTS

| | | | |
|---|---|---|---|
| 2011/0032980 A1* | 2/2011 | Gao | H04N 19/597 375/240.01 |
| 2012/0224634 A1* | 9/2012 | Yamori | H04N 19/597 375/240.16 |
| 2013/0057646 A1 | 3/2013 | Chen et al. | |
| 2013/0229485 A1* | 9/2013 | Rusanovskyy | H04N 13/0048 348/43 |
| 2014/0104383 A1* | 4/2014 | Yoshitomo | H04N 19/597 348/43 |

FOREIGN PATENT DOCUMENTS

| | | |
|---|---|---|
| WO | 2013072484 A1 | 5/2013 |
| WO | 2013107931 A1 | 7/2013 |

OTHER PUBLICATIONS

International Search Report and Written Opinion—PCT/US2013/060424—ISA/EPO—dated Dec. 13, 2013.

Li D., et al., "Enhanced block prediction in stereoscopic video coding", 3DTV Conference: The True Vision—Capture, Transmission and Display of 3D Video (3DTV-CON), 2011, IEEE, May 16, 2011 (May 16, 2011), pp. 1-4, XP031993733, DOI: 10.1109/3DTV.2011.5877163 ISBN: 978-1-61284-161-8 section [3.3 Joint prediction mode].

Schwarz H., et al., "Test Model under Consideration for HEVC based 3D video coding v3.0", 100. MPEG Meeting; Apr. 30, 2012-May 4, 2012; Geneva; (Motion Picture Expert Group or ISO/IEC JTC1/SC29/WG11), No. N12744, Jun. 1, 2012 (Jun. 1, 2012), XP030019217, pp. 1-46.

Zhang L., et al., "CE5.h: Disparity vector generation results", Jul. 11, 2012 (Jul. 11, 2012), 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/,, XP030130096, pp. 1-5.

An J., et al., "3D-CE3.h related: Advanced temporal residual prediction," MediaTek Inc., Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013, JCT3V-E0185, 3 Pages.

Zhang L., et al., "3D-CE5.h related: Advanced residual prediction for multiview coding," Qualcomm Incorporated, Joint Collaborative Team on 3D Video Coding Extension Development of ITU-T SG 16 WP 3 and ISO/IEC JTC 1/SC 29/WG 11, JCT3V-B0051, 2nd Meeting: Shanghai, CN, Oct. 13-19, 2012, 4 pages.

* cited by examiner

ADVANCED INTER-VIEW RESIDUAL PREDICTION IN MULTIVIEW OR 3-DIMENSIONAL VIDEO CODING

CROSS REFERENCE TO RELATED APPLICATION

This application claims a priority benefit from U.S. Provisional Patent Application No. 61/703,211, filed Sep. 19, 2012, which is hereby incorporated by reference in its entirety.

TECHNICAL FIELD

This disclosure relates to video coding and compression and, in particular, to multi-view and 3D video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include advanced inter-view residual prediction in a multi-view video coding.

In one embodiment, an apparatus for coding digital video is provided. The apparatus includes a memory configured to store current view video information and reference view video information. The apparatus further includes a processor in communication with the memory. The processor is configured to determine a value of a current video unit of the current view based at least on a motion compensated block of the reference view. The motion compensated block is determined based at least in part on motion information and a disparity vector associated with the current video unit.

In another embodiment, a method of decoding video is provided. The decoding method includes obtaining a video bitstream defining current view video information and reference view video information. The method also includes determining a value of a current video unit of the current view based at least on a motion compensated block of the reference view. The motion compensated block is determined based at least in part on motion information and a disparity vector associated with the current video unit.

In an additional embodiment, a method of encoding video is provided. The encoding method includes generating a video bitstream defining current view video information and reference view video information. The encoding method also includes determining a value of a current video unit of the current view based at least on a motion compensated block of the reference view. The motion compensated block is determined based at least in part on motion information and a disparity vector associated with the current video unit.

In a further embodiment, a computer readable storage medium comprising executable instructions is provided. The instructions cause an apparatus to obtain current view video information and reference view video information. The instructions also cause an apparatus to determine a value of a current video unit of the current view based at least on a motion compensated block of the reference view. The motion compensated block is determined based at least in part on motion information and a disparity vector associated with the current video unit.

In a still further embodiment, an apparatus for coding digital video is provided. The apparatus includes means for obtaining current view video information and reference view video information. The apparatus further includes means for determining a value of a current video unit of the current view based at least on a motion compensated block of the reference view. The motion compensated block is determined based at least in part on motion information and a disparity vector associated with the current video unit.

The details of one or more examples are set forth in the accompanying drawings and the description below. Other features, objects, and advantages will be apparent from the description and drawings, and from the claims.

DETAILED DESCRIPTION

Figure 1:
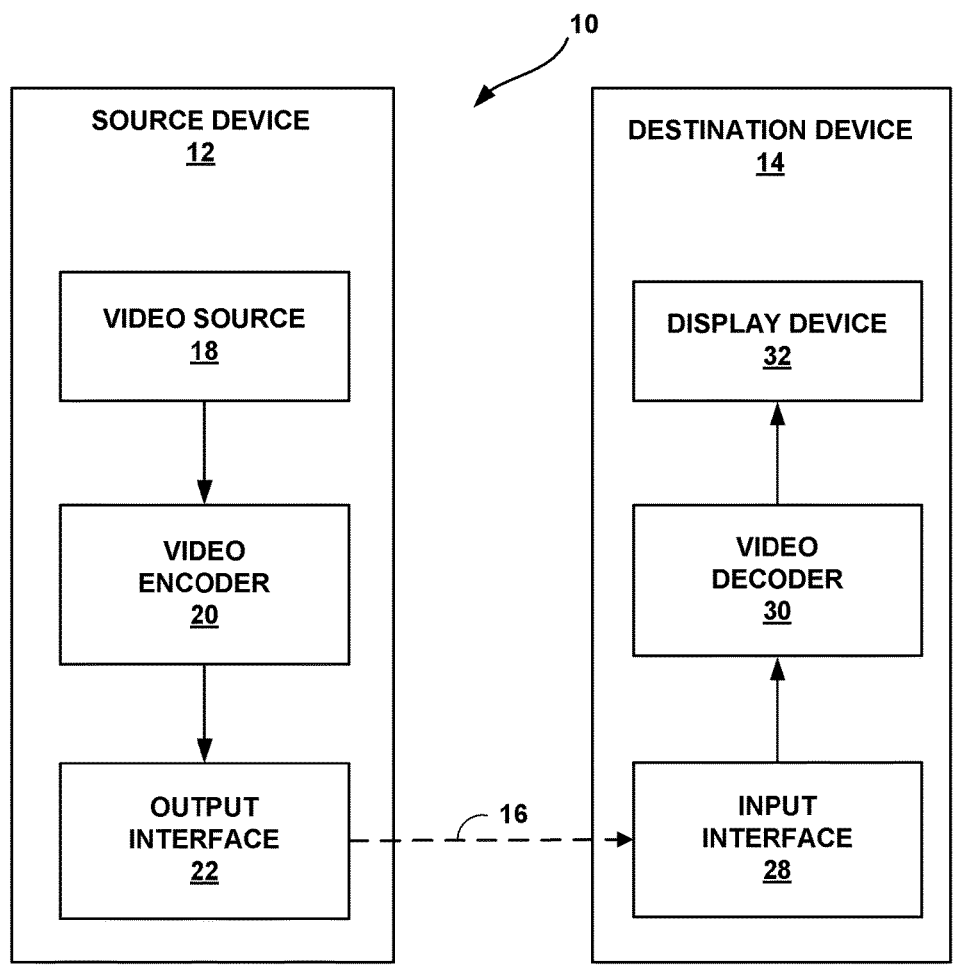
FIG. 1 is a block diagram illustrating an example video encoding and decoding system that may utilize techniques in accordance with aspects described in this disclosure.

Generally described, the present disclosure relates to multi-view video coding or 3D video coding. During the video coding process, predictions may be made regarding the components of individual video units (e.g., pixels or blocks of pixels) based on other video units. When video is encoded, the predictions can be compared to the source information for the video unit, and the difference between the prediction and the source, referred to as the residue, can be determined. The residue can be coded in a way that requires less space to store and/or less bandwidth to transmit than the source video, thereby conserving computing resources. When the video is decoded, the same prediction can be made and added to the residue in order to produce the final decoded video unit. In single-view video coding, the predictions are typically spatial (e.g., based on other video units in the same frame of current video unit being coded) or temporal (e.g., based on corresponding video units of prior or subsequent frames). In 3D or multi-view coding, different views of the same scene at the same time (e.g., stereoscopic views) may be coded in a single bitstream. In some embodiments, two or more views may be presented together to produce a three-dimensional effect. In multi-view coding, predictions for blocks in one view may be made on a spatial or temporal basis, as described above, or on an inter-view basis (e.g., based on corresponding video units of a reference view for the same frame, i.e., located within the same access unit).

Residual prediction may be used to further reduce storage and/or bandwidth requirements by predicting the residue for particular video units. A difference residue, representing the difference between the current residue and a predicted residue, may be encoded, further conserving resources by facilitating more efficient coding, storage, and/or transmission than the full current residue. In some multi-view coding implementations (e.g., 3D-HEVC), inter-view residual prediction for a current block in a current view is accomplished by locating a corresponding block in another view (e.g., a reference view) using a disparity vector (e.g., a vector based on the different angles in which each view of the scene was captured). The residue of that corresponding block is used as a predictor of the residue of the current block in the current view. Usage of inter-view residual prediction may be signaled by the encoder, such that a decoder knows whether or not to perform the inter-view residual prediction processed described herein. A flag to indicate the usage of inter-view residual prediction may be conditionally signaled, such as on a per-CU basis. For example, an encoder may traverse each transform unit (TU). If a TU is found that is inter coded (e.g., using intra-view inter prediction) and contains a non-zero coded block flag (CBF) value, then the inter-view residual prediction flag may be transmitted for the CU. Otherwise, if all the TUs are coded as being intra coded, or if they all have 0 residual (e.g., all CBF units are zero), then the flag is not signaled. All TUs covered or partially covered by a residual reference region may be traversed and analyzed. If any TU in the residual reference region is inter-coded and contains a non-zero CBF value (luma CBF or chroma CBF), the related residual reference is marked as available and residual prediction may be applied. In such a case, a flag indicating the usage of inter-view residual prediction may be transmitted as part of the CU syntax. If this flag is equal to 1, the current residual signal is predicted using the potentially interpolated reference residual signal and only the difference is transmitted using transform coding. Otherwise, the residual of the current block is conventionally coded using the HEVC transform coding. Although this type of inter-view residual prediction can improve the overall quality of the prediction of the current block, it has at least three drawbacks. First, the reference view may not be coded using the same motion information as the current view. When two blocks are predicted with different motion, the correlation between them is relatively low, and therefore the prediction performance will be sub-optimal. Second, reconstructed residues from the reference view are used in prediction. This can introduce a quantization error to the prediction and further degrade performance. Thirdly, the residual of a reference view shall be stored, which requires additional memory.

Aspects of this disclosure relate to inter-view residual prediction using the same motion information for both a current block in a current view and a corresponding block in a reference view. Although the examples described herein focus on generating a prediction for a block in a current view (e.g., a non-base view) from a base view, in some embodiments a prediction may be made from a block in another non-base view. Generally described, any view from which an inter-view prediction for a block in a current view is made may be referred to as a reference view. When generating the residual prediction for the current block, motion information (e.g., a motion vector) associated with the current block is used to generate the residual prediction from the corresponding block in the reference view. For example, the residual prediction may be generated as the difference between the previously reconstructed corresponding block in the reference view and a reference block identified using the motion vector from the current block in the current view. The motion vector for the current block is used even if corresponding block in the reference view is associated with a different motion vector. This ensures that the residual prediction for the current block is generated using the same motion compensation as the current block, and not some other motion compensation.

Additional aspects of the present disclosure relate to introduce weighting factors to the inter-view residual prediction. The weighting factor can be used to apply quantization normalization to the residual prediction, thereby reducing or preventing a quantization error when the current view and reference view are coded in different qualities. In some embodiments, the weighting factor may be determined based on the best rate distortion achieved from application of each of a predetermined list of weighting factors. For example, rate distortions observed from application of each of the weighting factors 0.0, 0.5, and 1.0 may be analyzed, and the weighting factor providing the most desirable rate distortion may be selected.

Multi-view video coding (MVC) is an extension of H.264/AVC. In some embodiments, MVC refers to 3-dimensional or 3D coding as well. The methods and devices described herein are applicable to MVC and other multi-view video coding standards and implementations. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A draft of HEVC is available from http://wg11.sc29.org/jct/doc_end_user/current_document.php?id=5885/JCTVC-I1003-v2, as of Jun. 7, 2012. Another recent draft of the HEVC standard, referred to as "HEVC Working Draft 7" is downloadable from http://phenix.it-sudparis.eu/jct/doc_end_user/documents/9_Geneva/wg11/JCTVC-I1003-v3.zip, as of Jun. 7, 2012. The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, Apr. 27, 2012 to May 7, 2012. Another draft of the HEVC standard, referred to as HEVC WD8 (working draft 8) is available from http://phenix.int-evry.fr/jct/doc$_{13}$ end_user/documents/10_Stockholm/wg11/JCTVC-J1003-v8.zip. Each of these references is incorporated by reference in its entirety.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2A:
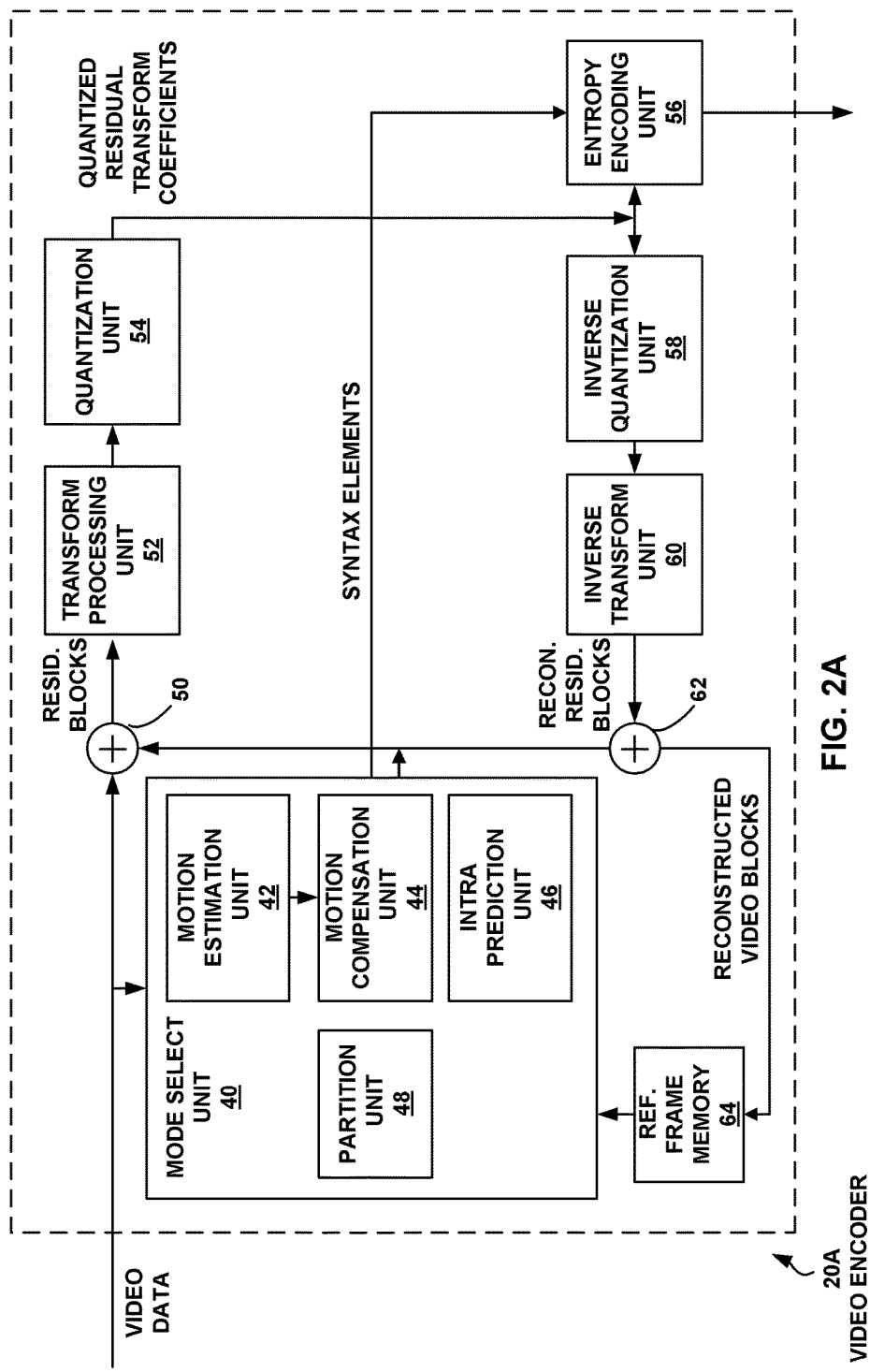
FIG. 2A is a block diagram illustrating an example of a video encoder that may implement techniques in accordance with aspects described in this disclosure.
Figure 2B:
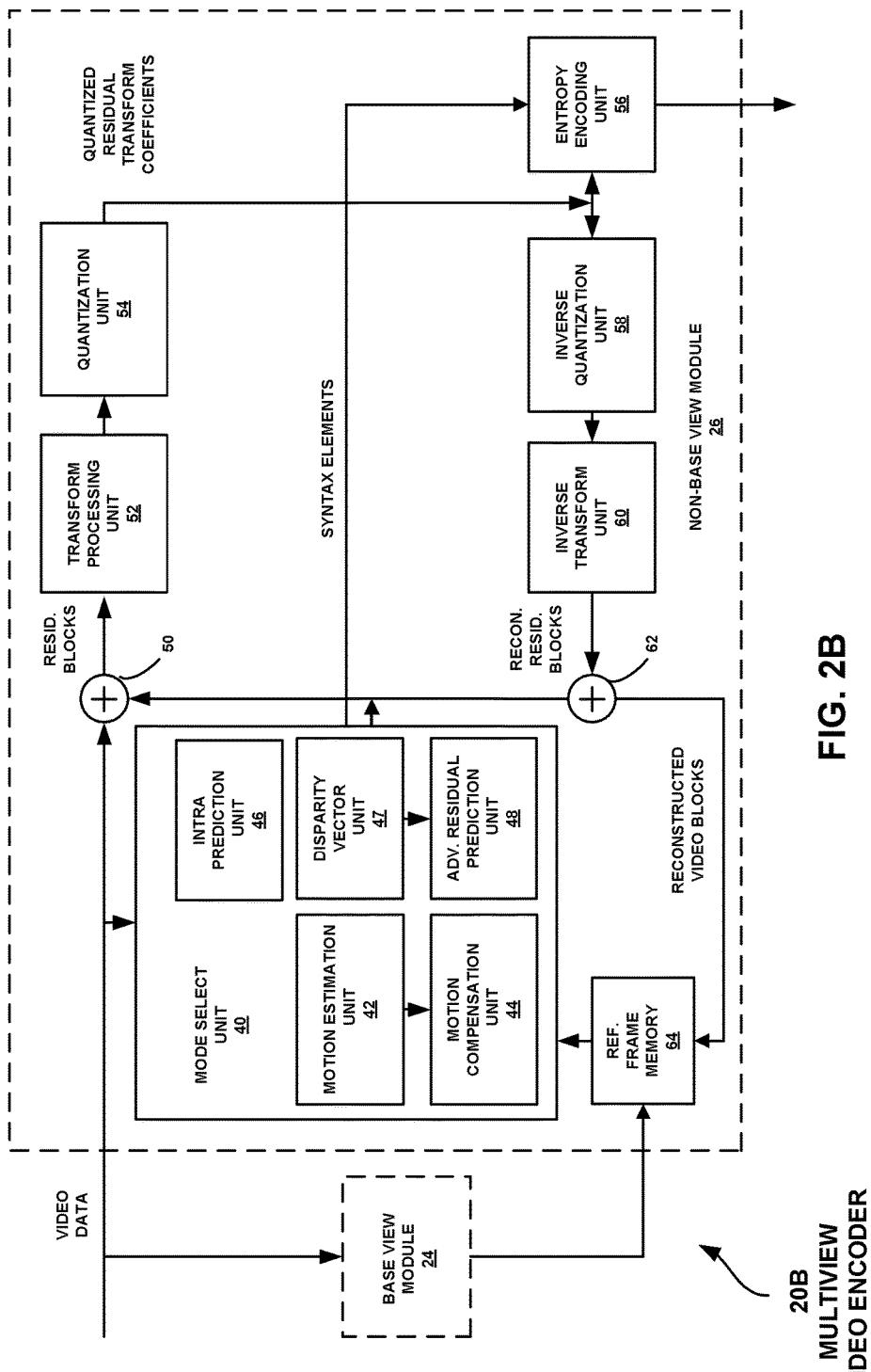
FIG. 2B is a block diagram illustrating an example of a multi-view video encoder that may implement techniques in accordance with aspects described in this disclosure.

FIGS. 2A and 2B are block diagrams illustrating example video encoders that may implement techniques in accordance with aspects described in this disclosure. The video encoder 20A shown in FIG. 2A may be configured to perform single view video coding. In some embodiments, the modules and components shown in FIG. 2A may be incorporated into a base view module of a multi-view encoder. As shown in FIG. 2B, a multi-view video encoder 20B many include a base view module 24 and a non-base view module 26. The base view module 24 may be similar or identical in many respects to the video encoder 20A shown in FIG. 2A, and is therefore shown for simplicity as a single block in communication with the non-base view module 26. The video encoders 20A, 20B shown in FIGS. 2A and 2B may perform any or all of the techniques of this disclosure. As one example, disparity vector unit 47 of the multi-view video encoder 20B illustrated in FIG. 2B may be configured to determine a disparity vector (e.g., a vector referring to a block in a different view), and the advanced residual prediction unit 48 may be configured to perform inter-view residual prediction, application of inter-view residual prediction weighting factors, and/or any other techniques described in this disclosure. However, aspects of this disclosure are not so limited. In some examples, the techniques described in this disclosure may be shared among the various components of the video encoders 20A, 20B. In some examples, in addition to or instead of, a processor (not shown) may be configured to perform any or all of the techniques described in this disclosure.

Video encoders 20A, 20B may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes. Video encoder 20B may also perform inter-view residual coding of video blocks in different views, as described in greater detail below.

As shown in FIG. 2A, video encoder 20A receives a current video block within a video frame to be encoded. In the example of FIG. 2A, video encoder 20A includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20A also includes inverse quantization unit 58, inverse transform unit 60, and summer 62. A deblocking filter (not shown in FIG. 2A) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20A receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20A may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20A may calculate values for sub-integer pixel positions of reference pictures stored in reference frame memory 64. For example, video encoder 20A may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30A in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20A may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20A forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. In the case of context-based entropy encoding, context may be based on neighboring blocks. Following the entropy encoding by entropy encoding unit 56, the encoded bitstream may be transmitted to another device (e.g., video decoder 30A) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In multi-view coding implementations, the components illustrated in FIG. 2A and described above may form a base view module of a multi-view video encoder 20B. The base view module 24, shown as a single block in FIG. 2B for simplicity, may communicate with a non-base view module 26 of the multi-view video encoder 20B. The non-base view module 26 may be similar or identical in many respects to the base view module 24. In addition, the non-base view module 26 may include modules or components designed to perform the multi-view-specific coding processes, such as inter-view prediction. For example, the non-base view module 26 may include a disparity vector unit 47 and an advanced residual prediction unit 48. The disparity vector unit 47 can be configured to determine a disparity vector for inter-view prediction, as described in greater detail below. The advances residual prediction unit 48 can be configured to perform the advanced residual prediction processes described in greater detail below. The non-base view module 26 may receive or otherwise access reference frames from the base view module 24, as shown, in order to perform inter-view prediction.

Figure 3A:
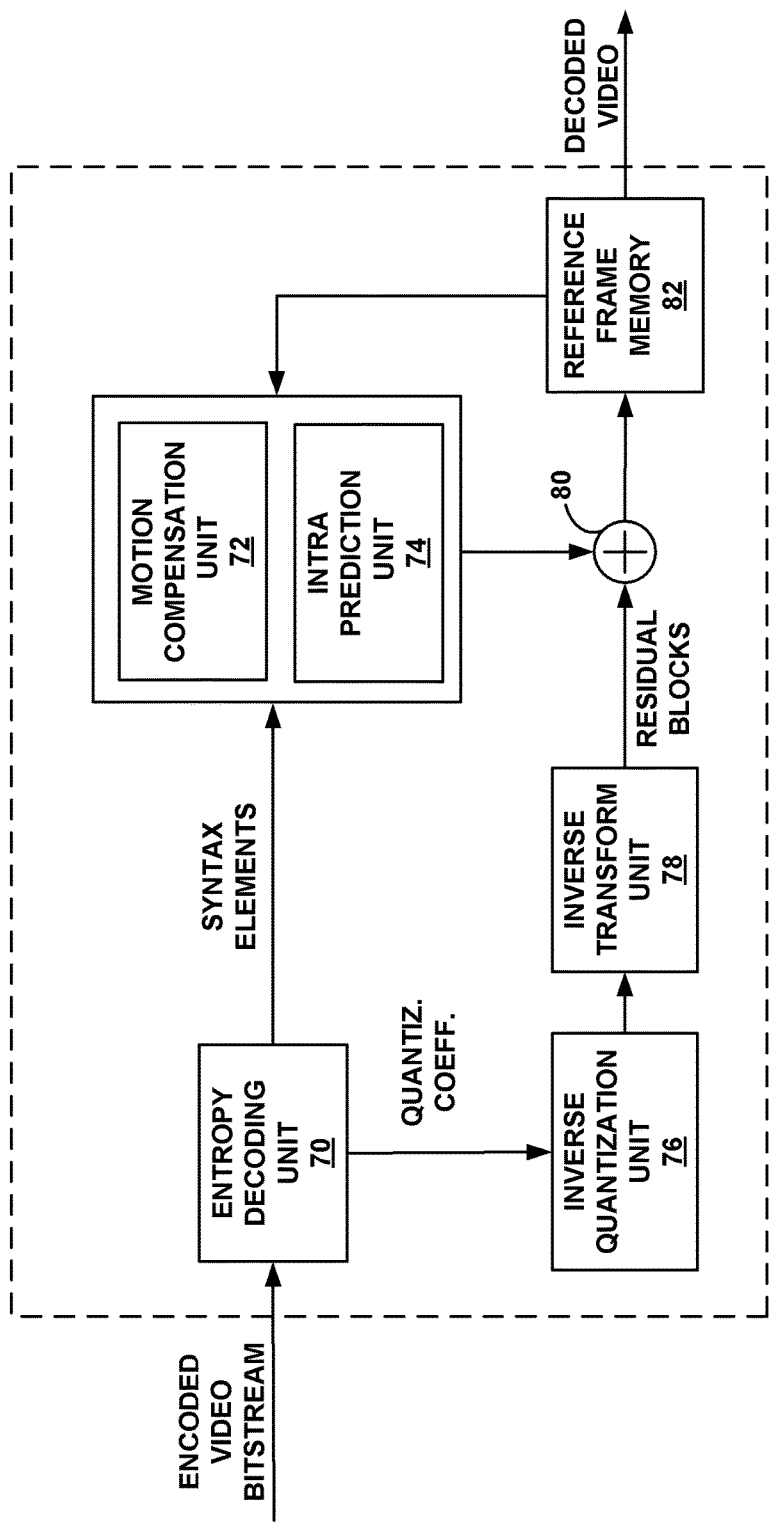
FIG. 3A is a block diagram illustrating an example of a video decoder that may implement techniques in accordance with aspects described in this disclosure.
Figure 3B:
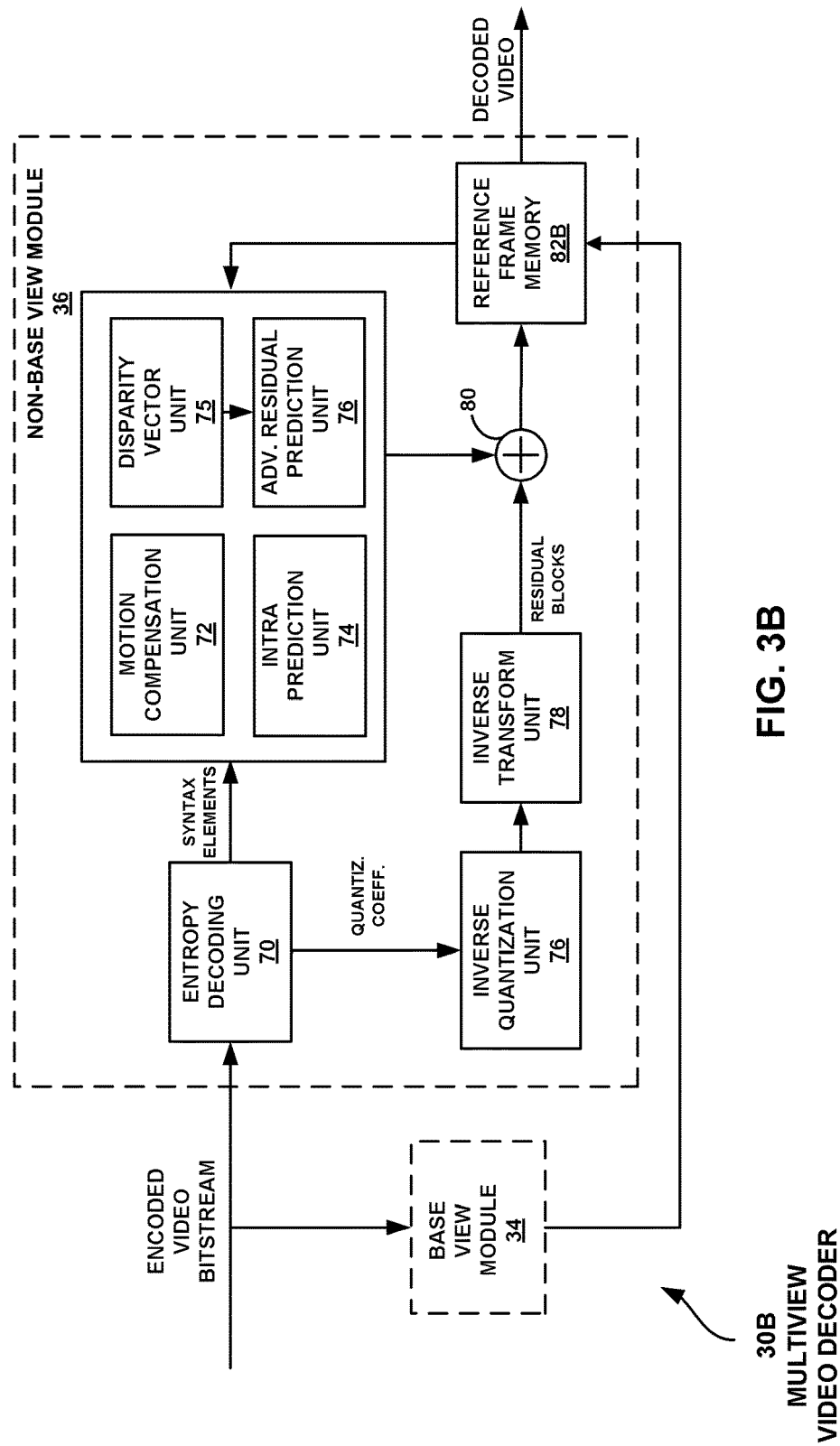
FIG. 3B is a block diagram illustrating an example of a multi-view video encoder that may implemented techniques in accordance with aspects described in this disclosure.

FIGS. 3A and 3B are block diagrams illustrating example video decoders that may implement techniques in accordance with aspects described in this disclosure. The video decoder 30A shown in FIG. 3A may be configured to perform single view video decoding. In some embodiments, the modules and components shown in FIG. 3A may be incorporated into a base view module 34 of a multi-view decoder. As shown in FIG. 3B, a multi-view video decoder 30B may include a base view module 34 and a non-base view module 36. The base view module 34 may be similar or identical in many respects to the video decoder 23A shown in FIG. 3A, and is therefore shown for simplicity as a single block in communication with the non-base view module 36. The video decoders 30A, 30B shown in FIGS. 3A and 3B may perform any or all of the techniques of this disclosure. As one example, disparity vector unit 75 of the multi-view video decoder 30B illustrated in FIG. 3B may be configured to determine a disparity vector (e.g., a vector referring to a block in a different view), and the advanced residual prediction unit 76 may be configured to perform inter-view residual prediction, application of inter-view residual prediction weighting factors, and/or any other techniques described in this disclosure. However, aspects of this disclosure are not so limited. In some examples, the techniques described in this disclosure may be shared among the various components of the video decoders 30A, 30B. In some examples, in addition to or instead of, a processor (not shown) may be configured to perform any or all of the techniques described in this disclosure.

In the example of FIG. 3A, video decoder 30A includes an entropy decoding unit 70, motion compensation unit 72, intra prediction unit 74, inverse quantization unit 76, inverse transformation unit 78, reference frame memory 82 and summer 80. Video decoder 30A may, in some examples, perform a decoding pass generally reciprocal to the encoding pass described with respect to video encoder 20A (FIG. 2A). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30A receives an encoded video bitstream that represents video blocks of an encoded video slice and associated syntax elements from video encoder 20A. Entropy decoding unit 70 of video decoder 30A entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30A may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30A may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20A during encoding of the video blocks to calculate interpolated values for sub-integer pixels of reference blocks. In this case, motion compensation unit 72 may determine the interpolation filters used by video encoder 20A from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 80. The inverse quantization process may include use of a quantization parameter $QP_Y$ calculated by video decoder 30A for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30A forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

In multi-view coding implementations, the components illustrated in FIG. 3A and described above may form a base view module of a multi-view video decoder 30B. The base view module 34, shown as a single block in FIG. 3B for simplicity, may communicate with a non-base view module 36 of the multi-view video decoder 30B. The non-base view module 36 may be similar or identical in many respects to the base view module 34. In addition, the non-base view module 36 may include modules or components designed to perform the multi-view-specific coding processes, such as inter-view prediction. For example, the non-base view module 36 may include a disparity vector unit 75 and an advanced residual prediction unit 76. The disparity vector unit 75 can be configured to determine a disparity vector for inter-view prediction, as described in greater detail below. The advances residual prediction unit 76 can be configured to perform the advanced residual prediction processes described in greater detail below. The non-base view module 36 may receive or otherwise access reference frames from the base view module 34, as shown, in order to perform inter-view prediction.

A typical motion compensation loop is defined below. This motion compensation loop is used in both HEVC and H.264/AVC. The reconstruction of a current frame Î equals de-quantized coefficients r for the frame, plus a temporal prediction P:

$$Î = r + P \quad (1)$$

where P indicates uni-directional prediction for P frames or bi-directional prediction for B frames.

To further improve the coding efficiency in multi-view coding implementations, inter-view prediction may be used. For example, inter-view motion prediction and/or inter-view residual prediction may be used. FIGS. 4-8 and the description below provide example implementations and enhancements to inter-view residual prediction that can improve multi-view coding efficiency and quality.

Figure 4:
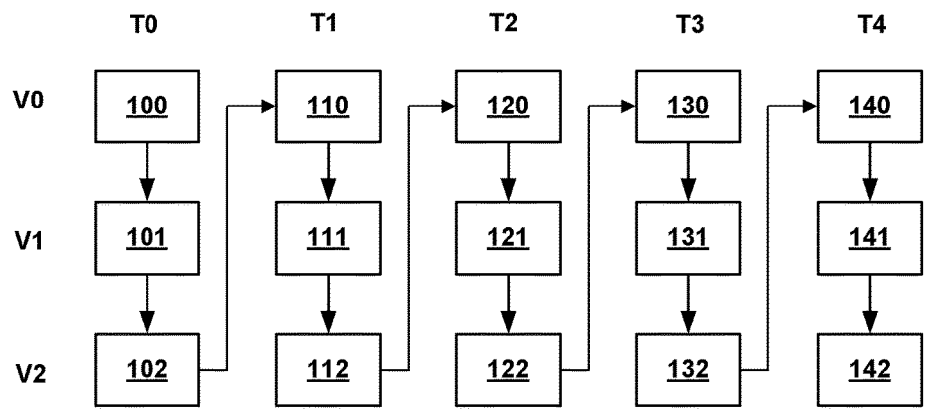
FIG. 4 is a block diagram illustrating an example of a multi-view bitstream decoding order.

FIG. 4 illustrates an example multi-view bitstream. Several views V0, V1 and V2 are shown, including video frames in each of several time instances T0, T1, T2, T3 and T4. For example, V0 includes frames 100, 110, 120, 130 and 140, each in one of the five distinct time instances. V1 includes frames 101, 111, 121, 131 and 141, each in one of the five distinct time instances. The image in each of V1's time instances may be an image of the same object or scene as the corresponding image and time instance of V0. However, the images from V1 may be from a different angle or otherwise different viewpoint. V2 includes frames 102, 112, 122, 132 and 142, each in one of the five distinct time instances. The images in V2 may also correspond to images of the same object or scene as the images of V1 and V0. However, the images from V1 may be from a third different angle. In some embodiments, the number of views may be less or more than those shown in FIG. 4 and described herein. In some embodiments, one or more views may not have a frame for each and every time instance, but may instead have frames in some subset of all time instances of the video.

The arrows in FIG. 4 represent one possible decoding order arrangement. This decoding order can be referred to as time-first coding. The columns can represent distinct access units (AU). Each AU contains the coded pictures of all the views (e.g., V0, V1, etc.) for one output time instance (e.g., T0, T1, etc.). In some embodiments, the decoding order of access units is not identical to the output or display order. In other embodiments, the decoding order of AUs is the same as the output or display order.

Figure 5:
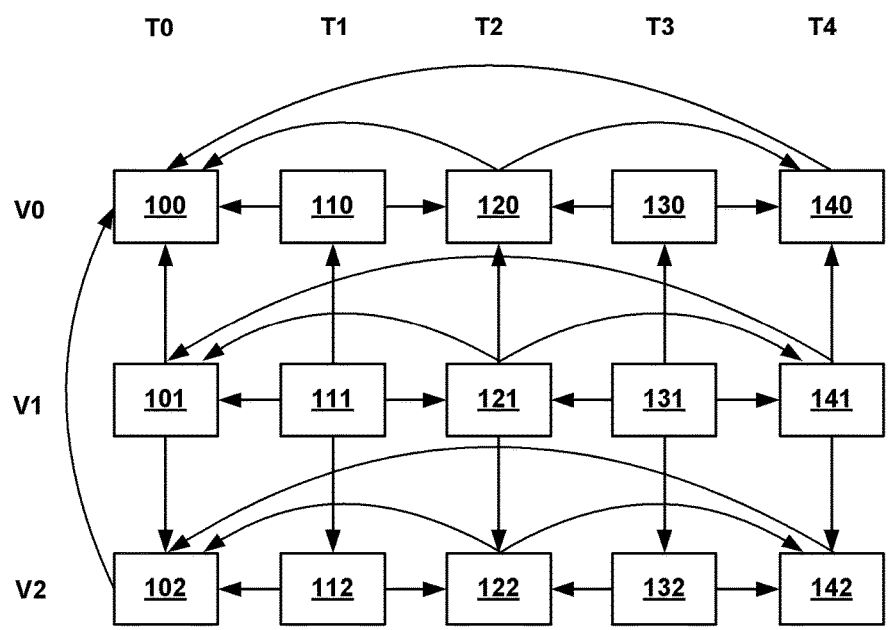
FIG. 5 is a block diagram illustrating an example of a multi-view prediction structure.

FIG. 5 illustrates an example multi-view prediction structure. The multi-view prediction structure shown in FIG. 5 includes both intra-view and inter-view predictions. Predictions are indicated by arrows. The source object for a given arrow may use the target object of the arrow as a prediction reference (e.g., the pointed-from object uses the pointed-to object for prediction).

As shown, predictions for some frames (e.g., 121) may use frames in the same view or frames in a different view as reference frames. For example, frames 101 and 141 may be reference frames used to generate temporal motion predictions for frame 121. Each of those frames is in the same view V1. Frames 120 and 122 may be used to generate inter-view predictions for frame 121. Frames 120 and 122, in views V0 and V2, respectively, may also be predicted from different frames. For example, frames 100 and 140 may be reference frames used to generate temporal or motion predictions for frame 120. Each of those frames is in the same view V0. However, motion prediction for frame 120 may use a different motion vector than motion prediction for frame 121. As a result, the correlation between frames 120 and 121 may be low or sub-optimal for producing inter-view residual predictions. In order to reduce or prevent this problem, the motion vector from frame 121 may be re-used to generate the residual prediction from frame 120, as described in greater detail below.

In multi-view coding, the inter-view prediction may be implemented through the use of disparity motion compensation. Disparity motion compensation can use the syntax of the H.264/AVC motion compensation, while allowing a picture in a different view to be used as a reference picture (e.g., by using a disparity vector). Generally described, a disparity vector may be a motion vector that points to an inter-view reference picture. Inter-view prediction is typically used among pictures in the same AU (e.g., difference views within the same time instance). When coding a picture in one view, pictures in other views may be added to a reference picture list if they are within the same time instance. As with inter-frame prediction reference pictures, an inter-view reference picture can be put in any position of a reference picture list.

One method of deriving a disparity vector is Neighboring Blocks-based Disparity Vector (NBDV). In NBDV, the motion vectors of spatial or temporal neighboring blocks are checked in a fixed checking order to identify a disparity motion vector: a motion vector that points to an inter-view reference picture. Once a disparity motion vector is identified, the checking process is terminated and the identified disparity motion vector is returned and converted into the disparity vector used in inter-view motion prediction and inter-view residual prediction. If no disparity motion vector is found after checking all the pre-defined neighboring blocks, a "zero" disparity vector is used for the inter-view motion prediction, and inter-view residual prediction is disabled for the corresponding coding unit (CU).

Five spatial neighboring blocks may be used for the disparity vector derivation: the below-left, left, above-right, above and above-left blocks of current prediction unit (PU), which may be denoted $A_0$, $A_1$, $B_0$, $B_1$ and $B_2$, respectively. The temporal neighboring blocks may come from a candidate reference picture. Any reference picture from the current view may be treated as a candidate picture. In some embodiments, the number of candidate pictures can be further constrained (e.g., to the four temporally closest pictures, etc.). The candidate reference pictures may be checked in some predetermined or dynamically determined order. For each candidate picture, three candidate regions may be used for deriving the temporal neighboring blocks: CPU (e.g., the co-located region of the current PU or current CU); CLCU (e.g., the largest coding unit (LCU) covering the co-located region of the current PU); and BR (e.g., the bottom right 4×4 block of the CPU).

In one embodiment, spatial neighboring blocks are checked first, followed by temporal neighboring blocks. The checking order of the five spatial neighboring blocks may be defined as $A_1$, $B_1$, $B_0$, $A_0$ and then $B_2$. For each candidate picture, the three candidate regions (CPU, CLCU, BR) in the candidate picture are checked in order. The checking order of the three regions may be defined as: CPU, CLCU and BR for the first non-base view and BR, CPU, CLU for the second non-base view.

The method of deriving a disparity vector described above is illustrative only, and is not intended to be limiting. In some embodiments, any other method of identifying, deriving, or generating a disparity vector may be used. A detailed illustration of the use of disparity vectors in inter-view residual prediction is shown in FIG. 6.

Figure 6:
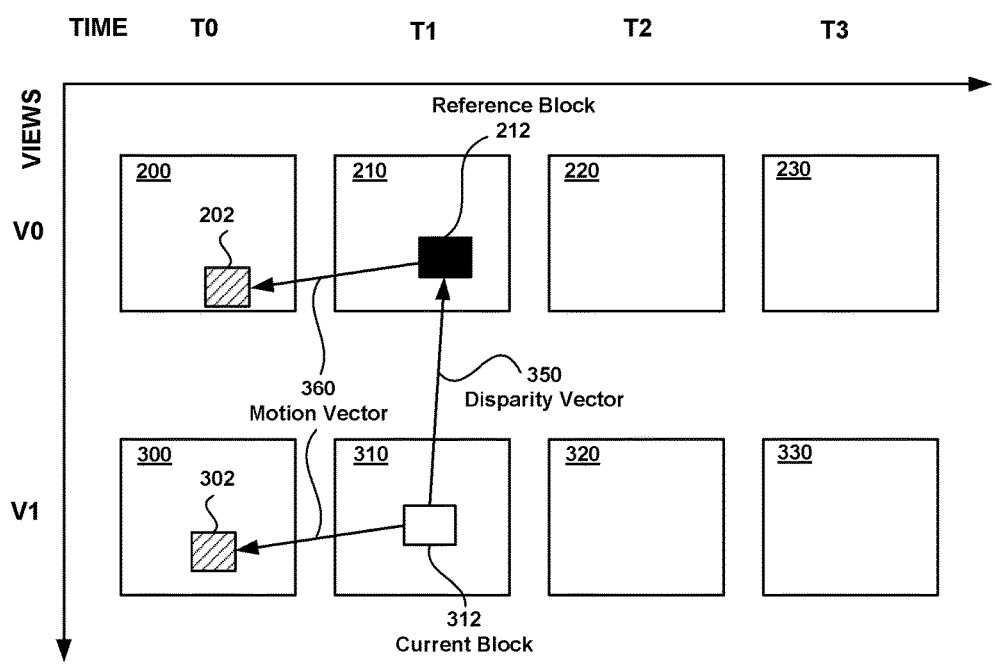
FIG. 6 is a block diagram illustrating an example of using motion information from a current view in a reference view.

FIG. 6 illustrates several frames in each of two different views: V0 and V1. Corresponding frames from each view are grouped in to AUs that correspond to different instances of time: T0, T1, T2 and T3. Frames 200 and 300 are in the AU for T0; frames 210 and 310 are in the AU for T1; frames 220 and 320 are in the AU for T2; and frames 230 and 330 are in the AU for T3.

For current block 312 to be coded in view V1 at time T1, it may be predicted from a block identified by a motion vector 360 associated with the current block 312. For example, current block 312 may be predicted from block 302 (denoted $P_c$ in equation (2) below) in frame 300, corresponding to time instance T0 of the same view V1. Residual samples may be obtained by subtracting the original samples (e.g., original pixel values) of the current block 312 from block 302 ($P_c$).

A reference block 212 of a reference view V0 can be located by a disparity vector, such as disparity vector 350. Rather than using the residue of the reference block 212 directly as a predictor for the residue of the current block 312, the motion vector 360 from the current block 312 can be re-used to identify a motion predictor for the reference block 212 (e.g., a reference block for the reference block 212). Using this method ensures that the motion-compensated residual prediction from reference block 212 is obtained using the same motion information as the residual samples of the current block being coded—block 312. In FIG. 6, the reference block for reference block 212, identified by re-using motion vector 360 from the current block 132, is block 202. The difference of the reconstructed reference block 212 and its motion prediction from block 202 may be denoted $r_b$.

In a manner similar to the intra-layer inter prediction motion compensation described above, $r_b$ (the difference between blocks 212 and 202) may be subtracted from the residual samples of the current block 312 (e.g., the difference between the prediction $P_c$ and the original source video data for current block 312). The resulting difference signal (denoted $r_c$) is saved (e.g., transform coded and added to the bitstream). Therefore, when inter-view residual prediction is used, the motion compensation loop can be expressed by the following equation:

$$\hat{I}_c = r_c + P_c + r_b \quad (2)$$

where the reconstruction of the current block ($\hat{I}_c$) equals the difference between current block residue and reference block residue ($r_c$), plus the inter prediction ($P_c$), plus the reference block residue ($r_b$).

Quantization errors may be introduced to the reconstruction of the current block ($\hat{I}_c$) because a reconstruction of the reference block from the reference view is used to generate the inter-view residual prediction. To prevent or reduce the effects of such quantization errors, a weighting factor may be applied to the residue from the reference block. For example, the predictor of the residue of the current block can be generated by multiplication of the residual of the reference block ($r_b$) with a weighting factor unequal to 1. In some embodiments, the particular weighting factor to use may be selected from a list of pre-determined weighting factors known to both the encoder and the decoder. The encoder may determine the appropriate weighting factor to use based on, e.g., which weighting factor provides the best rate distortion. An index to the appropriate weighting factor may be signaled to the decoder.

In one specific, non-limiting example, there may be N different weighting factors to be signaled, where N can be 2, 3, 4 and so on. These weighting factors are first mapped to a unique weighting index, as shown in Table 1, below. The weighting index is signaled, rather than the value of the weighting factor.

TABLE 1

Mapping between weighting factor indices and weighting factors

| Value of weighting_factor_index | Value of Weighting Factors |
|---|---|
| 0 | $W_0$ |
| 1 | $W_1$ |
| 2 | $W_2$ |
| 3 | ... |
| 4 | ... |
| 5 | ... |
| ... | ... |
| N − 1 | $W_{N-1}$ |

In Table 1, the values weighting factors are indicated by $W_0, W_1, W_2, \ldots, W_{N-1}$ in the ascending order of values (e.g., 0.0, 0.5, and 1.0). Note that the ordering may be reversed or determined according to some other technique. For example, $W_0, W_1, W_2, \ldots, W_{N-1}$ may be weighting factors in the descending order of the probability that they will be used. In another specific, non-limiting example, the first three weighting factors may be equal to 0, 1, 0.5, and indexed 0, 1, 2, respectively. Any remaining weighting factors may be indexed 3 to N−1 based on the ascending order of values or descending order of probabilities.

In some embodiments, when a disparity vector derived from neighboring blocks is unavailable, the signaling of weighting indices is skipped and the weighting factor of the current block is set to 0. Alternatively, when the disparity vector derived from neighboring blocks is unavailable, a zero disparity vector or a global disparity vector can be used instead. In such a case, weighting indices may be signaled.

In some embodiments, an additional or alternative flag may be signaled, relating to the weighting factors. The additional flag indicates whether to skip the transform module when the weighting factor of current block is unequal to 0. Alternatively, the transform module is always skipped when the block is coded with a weighting factor unequal to 0. Typically, a transform is applied to remove the correlation within residuals in one block. However, due to better prediction achieved using the advanced residual prediction techniques described herein, the correlation among residuals may become relatively lower. Therefore, transform might not be needed any more.

Figure 7:
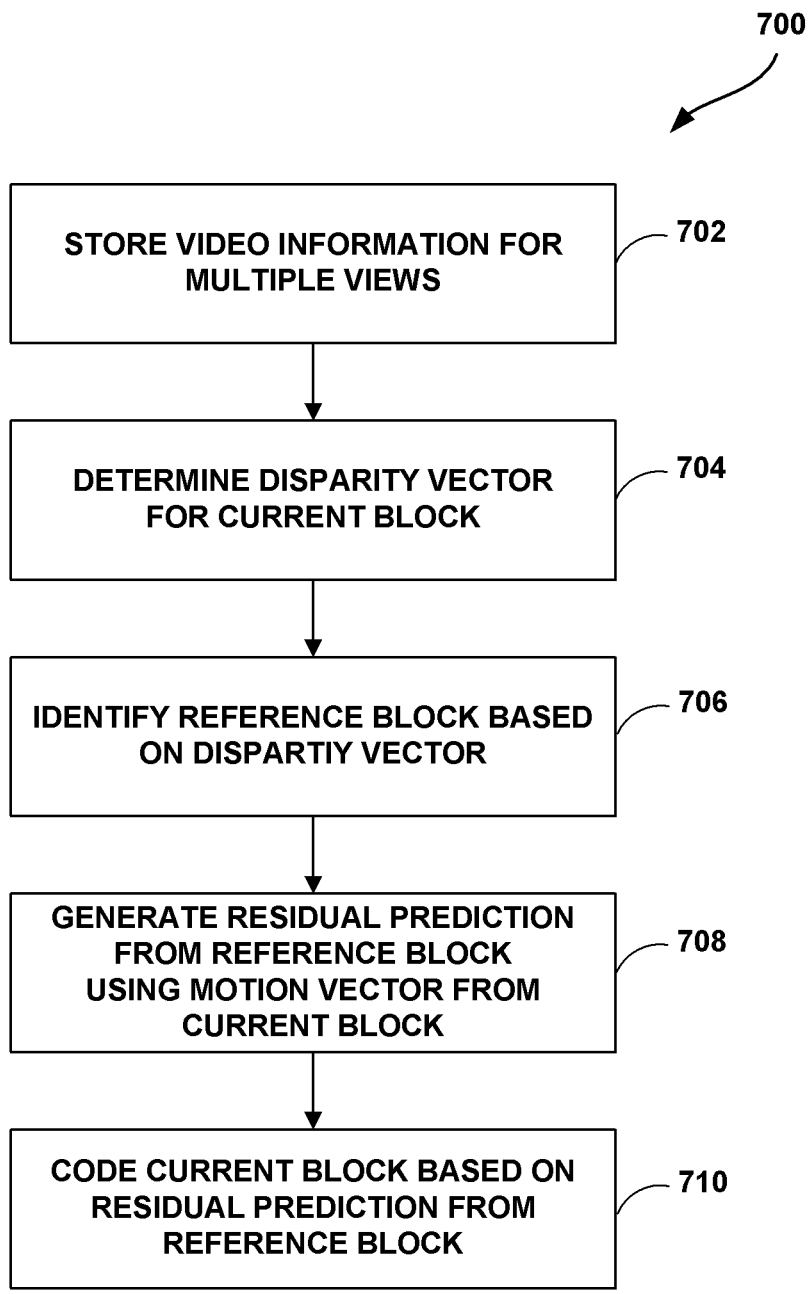
FIG. 7 is a flow diagram of an illustrative process for performing inter-view residual prediction using motion information from the current view in the reference view.

FIG. 7 is a flow diagram of an illustrative process 700 for performing inter-view residual prediction. For example, a digital video coder, such as the multi-view encoder 20B or multi-view decoder 30B described above, may use the process 700 to perform inter-view residual prediction in multi-view coding. In some embodiments, the process 700 may be performed by some other component or apparatus. Illustratively, the description which follows describes the steps of the process 700 with respect to the decoder 30B in FIG. 3B.

The process 700 begins at block 702, where video information is stored. For example, video information associated with a first view, a second view, one or more additional views, one or more upsampled/downsampled views, or any combination thereof may be stored at block 702.

At block 704, a disparity vector may be determined for a current block in a current view, such as current block 312 in view V1, as shown in FIG. 6. In some embodiments, as described above, NBDV or some other method or process for determining a disparity vector may be used.

At block 706, a reference block in a reference view may be identified using the disparity vector. For example, as shown in FIG. 6, disparity vector 350 may be used to identify reference block 212 in reference view V0.

At block 708, a residual prediction for the current block may be generated by re-using the motion vector from the current block. For example, as shown in FIG. 6, motion vector 360 may be used to obtain a reference block 202 for the reference block 212. The difference between blocks 202 and 212 may be calculated to give a residual prediction for current block 312. Advantageously, this residual prediction for current block 312 is obtained using the same motion information as used for the current block 312, thereby ensuring a higher correlation between the residual prediction and the current block 312 than predictions obtained using existing methods.

At block 710, the current block may be coded based on the residual prediction determined above. For example, when the process 700 is implemented by an encoder 20, the residual prediction from 708, above, may be subtracted from the residue for the current block (e.g., the difference between the source video for current block 312 in FIG. 6 and the reconstruction of block 302). The resulting difference may be transformed coded, quantized, and entropy coded. As another example, when the process 700 is implemented by a decoder 30, the residual prediction from 708, above, may be added to the entropy decoded, inverse quantized, and inverse transformed residue from the bitstream. In addition, the reconstruction of the inter predicted block (e.g., block 302 in FIG. 6) may be added, as described above with respect to equation (2), to give the reconstruction of the current block 312.

In one specific, non-limiting embodiment, for one reference picture list X (with X being 0 or 1), the inter-predicted current block may be represented as an inter-predicted luma sample array (which may be denoted predSampleLX$_L$) and chroma sample arrays (which may be denoted predSampleLX$_{cb}$ and predSampleLX$_{cr}$). For each reference list (e.g., list 0 or 1), if the reference picture for the current block is not an inter-view reference picture, a disparity vector may be derived, pointing to a target reference view. A reference block may be located in the same access unit of the reference review using the disparity vector. Motion compensation may be applied to the reference block by deriving a motion vector from the motion information for the current block, thereby deriving a residue block.

As described above and in greater detail below, a weighting factor may be applied to the residue block to get a weighted residue block (which may be denoted predARPSampleLX$_L$, predARPSampleLX$_{cb}$, and predARPSampleLX$_{cr}$). The final residue for the current block may be the sum of the weighted residue block and the predicted samples:

predSample*LX*$_L$=predSample*LX*$_L$+predARPSample*LX*$_L$ predSample*LX*$_{cb}$=predSample*LX*$_{cb}$+predARPSample*LX*$_{cb}$ predSample*LX*$_{cr}$=predSample*LX*$_{cr}$+predARPSample*LX*$_{cr}$ In some embodiments, this operation may be implemented as a matrix/vector adding operation.

Figure 8:
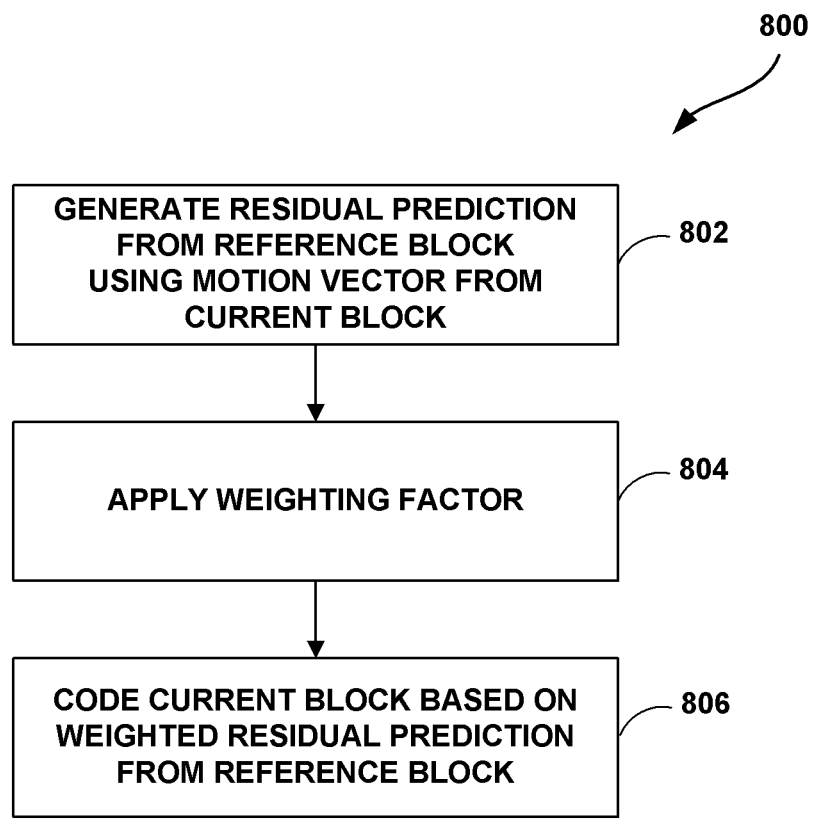
FIG. 8 is a flow diagram of an illustrative process for performing inter-view residual prediction using a weighting factor.

FIG. 8 is a flow diagram of an illustrative process 800 for using weighting factors in the inter-view residual prediction process. For example, a digital video coder, such as the multi-view encoder 20B or multi-view decoder 30B described above, may use the process 800 while performing the process 700 to apply a weighting factor to an inter-view residual prediction.

The process 800 begins at block 802, where a residual prediction is generated as described above (e.g., with respect to FIGS. 6 and/or 7). At block 804, a weighting factor may be applied to the prediction. The weighing factor may be dynamically determined, encoded in a bitstream, obtained from a list of weighting factors based on an index in the bitstream, etc. At block 806, the current block may be coded based the weighted residual prediction from the reference block. Illustratively, if the weighting factor is 1, then the unmodified residual prediction from the reference block is used. If the weighting factor is 0, then inter-view residual prediction is not used. If the weighting factor is between 1 and 0, then the weighting factor is applied and used to code the current block.

In some embodiments, a new syntax element to indicate the index of the weighting factors (e.g., weighting_factor_index), may be signaled as part of the coding unit. Table 2, below, shows one embodiment of a coding unit with the syntax element.

TABLE 2

| Sample Coding Unit | |
| --- | --- |
| coding_unit( x0, y0, log2CbSize , ctDepth) { | Descriptor |
| if( transquant_bypass_enable_flag ) { | |
|   cu_transquant_bypass_flag | ae(v) |
| } | |
| ... | |
| } else { /* PART_N×N */ | |
|   prediction_unit( x0, y0 , log2CUSize ) | |
|   prediction_unit( x1, y0 , log2CUSize ) | |
|   prediction_unit( x0, y1 , log2CUSize ) | |
|   prediction_unit( x1, y1 , log2CUSize ) | |
| } | |
| if ( !depth_flag && layer_id && | |
| PredMode != MODE_INTRA) | |
|   weighting_factor_index | ae(v) |
| ... | |
| if( !pcm_flag ) { | |
|   if( PredMode[ x0 ][ y0 ] != MODE_INTRA && | |
|     !(PartMode = = PART_2N×2N && | |
|     merge_flag[x0][y0]) ) | |
|     no_residual_syntax_flag | ae(v) |
|   if( !no_residual_syntax_flag ) { | |
|     MaxTrafoDepth = ( PredMode[ x0 ][ y0 ] = = | |
|     MODE_INTRA ? | |
|       max_transform_hierarchy_depth_intra + | |
|       IntraSplitFlag : | |
|       max_transform_hierarchy_depth_inter ) | |
|     transform_tree( x0, y0 x0, y0, log2CbSize, 0, 0 ) | |
|   } | |
| } | |
| } | |

In some embodiments, the syntax element may be signaled only when current view is the dependent texture view, the current CU is not intra-coded, and the derived disparity vector is available. When this syntax element is not present in the bitstream, the weighting factor may be inferred to be equal to 0. Table 3, below, shows one embodiment of a coding unit with the syntax element.

TABLE 3

| Sample Coding Unit | |
| --- | --- |
| coding_unit( x0, y0, log2CbSize , ctDepth) { | Descriptor |
| if( transquant_bypass_enable_flag ) { | |
|   cu_transquant_bypass_flag | ae(v) |
| } | |
| ... | |
| } else { /* PART_N×N */ | |
|   prediction_unit( x0, y0 , log2CUSize ) | |
|   prediction_unit( x1, y0 , log2CUSize ) | |
|   prediction_unit( x0, y1 , log2CUSize ) | |
|   prediction_unit( x1, y1 , log2CUSize ) | |
| } | |
| if ( !depth_flag && layer_id && PredMode != | |
| MODE_INTRA && DispVectAvai ) | |
|   weighting_factor_index | ae(v) |
| ... | |
| if( !pcm_flag ) { | |
|   if( PredMode[ x0 ][ y0 ] != MODE_INTRA && | |
|     !(PartMode = = PART_2N×2N && | |
|     merge_flag[x0][y0]) ) | |
|     no_residual_syntax_flag | ae(v) |
|   if( !no_residual_syntax_flag ) { | |
|     MaxTrafoDepth = ( PredMode[ x0 ][ y0 ] = = | |
|     MODE_INTRA ? | |
|       max_transform_hierarchy_depth_intra + | |

TABLE 3-continued

Sample Coding Unit

```
coding_unit( x0, y0, log2CbSize , ctDepth) {                Descriptor
          IntraSplitFlag :
          max_transform_hierarchy_depth_inter )
       transform_tree( x0, y0 x0, y0, log2CbSize, 0, 0 )
       }
     }
   }
}
```

In some embodiments, the syntax element may be signaled for each reference picture list. In some embodiments, the syntax element may be signaled as part of the PU. In some embodiments, the syntax element may be signaled only when the current CU or PU is coded using skip/merge mode. In some embodiments, the syntax element may be signaled only when the current CU or PU is associated with a temporal motion vector. In some embodiments, the parsing process of the syntax element is performed as described in section 6.2 of the HEVC specification.

In some embodiments, only a picture in the same reference view with the same picture order count (POC) is used to inter predict the reference picture during inter-view residual prediction. If there is no reference picture of the reference block with the same POC as the reference picture of current block, the weighting factor is set to 0 or inter-view prediction is otherwise suppressed. In other embodiments, the motion vector is scaled based on the POC to the first available temporal reference picture of the reference block.

Weighting indices may be signaled using a truncated unary binarization method (e.g., such as the method described in section 9.3.2.2 of the HEVC specification). In some embodiments, the weighting factors are first mapped to one unique weighting index based on the descending order of the probabilities of the weighting factors being used, and then coded with truncated unary binarization method.

In some embodiments, the binarization process can be implemented as shown in Table 4. For example, the bin string of weighting factor indices corresponding to values 3 to N−1 consists of the prefix "11" and a suffix, indexed by subtracting 3 from the value of weighting_factor_index where truncated unary binarization is used.

TABLE 4

Binarization of weighting factors (N is larger than 4)

| Value of Weighting_factor_index | Bin values | | | | | |
|---|---|---|---|---|---|---|
| 0 | 0 | | | | | |
| 1 | 1 | 0 | 0 | | | |
| 2 | 1 | 0 | 1 | | | |
| 3 | 1 | 1 | 0 | | | |
| 4 | 1 | 1 | 1 | 0 | | |
| 5 | 1 | 1 | 1 | 1 | 0 | |
| ... | 1 | 1 | 1 | 1 | 1 | 0 |
| N − 1 | 1 | 1 | 1 | 1 | ... | 1 |
| binIdx | 0 | 1 | 2 | 3 | ... | N − 3 |

When there are a total of four weighting factors, the binarization process may be implemented as shown in Table 5.

TABLE 5

Binarization of weighting factors (N = 4)

| Value of Weighting_factor_index | Bin values | | |
|---|---|---|---|
| 0 | 0 | | |
| 1 | 1 | 0 | 0 |
| 2 | 1 | 0 | 1 |
| 3 | 1 | 1 | 0 |
| binIdx | 0 | 1 | 2 |

When there are a total of three weighting factors (e.g., 0, 0.5 and 1), the binarization process may be implemented as shown in Table 6.

TABLE 6

Binarization of weighting factors (N = 3)

| Value of Weighting_factor_index | Bin values | |
|---|---|---|
| 0 | 0 | |
| 1 | 1 | 0 |
| 2 | 1 | 1 |
| binIdx | 0 | 1 |

Context initialization and context selection are two important aspects in entropy coding (including entropy encoding and entropy decoding). Context initialization corresponds to initialized or estimated probabilities of 0 or 1 in a binary arithmetic coder. A probability may be represented by an integer by being mapped from the actual probability. Given a context selection method, a probability of 0 or 1 for each context can be updated in the coding process. When the probabilities are updated to equal the actual probabilities, improved performance may be achieved. Proper context initialization and selection methods can shorten the updating process, thereby helping to achieve better performance.

Context initialization may be implemented in various ways. For example, the inter-view residual prediction techniques described herein may apply for both P slices and B slices. In some embodiments, the initial probability for the context of weighting indices of P slices may be different from that of the B slices. In other embodiments, all the context models are initialized with equal probability for different bin values, e.g., 0 and 1. In further embodiments, one set of contexts may be used for coding the weighting factor indices.

Context selection for weighting factor indices may also be implemented in various ways. The availability and weighting factors of the left and above neighboring blocks, with respect to the current block, may be utilized to construct context models of weighting factor indices. In one specific, non-limiting embodiment, a luma location (xC, yC) refers to the top-left luma sample of a current luma coding block relative to the top-left sample of the current picture. A variable (e.g., availableL) indicating the availability of the coding block located directly to the left of the current coding block may be derived by using an availability derivation process for a block in z-scan order (e.g., as specified in sub-clause 6.4.1 of HEVC specification). In using the availability derivation process, the location (xCurr, yCurr) is set equal to (xC, yC) and the neighboring location (xN, yN) is set equal to (xC−1, yC) as the input to the process. The output is assigned to availableL. Another variable (e.g., availableA) indicating the availability of the coding block located directly above the current coding block may be derived by using the same or a similar availability derivation process. The location (xCurr, yCurr) may be set equal to (xC, yC) and the neighboring location (xN, yN) set equal to (xC, yC−1) as the input to the process. Theo output is assigned to availableA.

In some embodiments, a flag (e.g., condTermFlagN, where N can be L or A) can be derived by determining whether mbPAddrN is available and weighting factor for the block mbPAddrN is unequal to 0. If so, condTermFlagN is set equal to 1. Otherwise (e.g., mbPAddrN is unavailable or weighting factor for the block mbPAddrN is equal to 0), condTermFlagN is set equal to 0.

In some embodiments, the ctxIdx may be the context index to be used to code the weighting factor indices. The ctxIdx increments (ctxIdxInc) for each bin to be coded may be derived by:

$$ctxIdxInc = M*condTermFlagL + N*condTermFlagA \quad (3)$$

where M or N can be 1 or 2.

In some embodiments ctxIdxInc may be derived by ctxIdxInc=condTermFlagA. In some embodiments, ctxIdxInc may be derived by ctxIdxInc=condTermFlagL. In some embodiments, ctxIdxInc is fixed to be 0.

The advanced residual prediction techniques of the present disclosure may apply to scalable video coding ("SVC") in addition to multi-view/3D video coding. Regardless of which type of coding is being used (SVC, MVC, or 3DV), generalized residual prediction ("GRP") can be applied to an intra PU/CU. In this scenario, the intra prediction for a reference block is performed using the same prediction mode as the current intra PU/CU, regardless of whether the reference block resides in a PU/CU of the base layer or base view (in SVC or MVC/3DV, respectively). The intra prediction residue of the base layer or base view block may be used in the same manner as the inter prediction residue of the base layer or base view block when the PU/CU is an inter PU/CU. In some embodiments, GRP may only apply to a luma component. For example, this is equivalent to setting the weighting factor for the chroma residue equal to zero.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for coding digital video, the apparatus comprising:
   a memory configured to store current view video information and reference view video information; and
   a processor configured to:
   identify a first reference block in a first time instance of a reference view using a disparity vector associated with a current video unit of a current view;
   identify a second reference block of the reference view, in a second time instance distinct from the first time instance, using the first reference block of the reference view and motion information associated with the current video unit of the current view;

determine a motion compensated block using the motion information associated with the current video unit of the current view;

determine a residual predictor block based on a difference between the second reference block and the first reference block multiplied by a weighting factor; and code the current video unit based at least on the motion compensated block and the residual predictor block.

2. The apparatus of claim 1, wherein the processor is further configured to:

encode a residue difference obtained by subtracting the residual predictor block from a residue of the current video unit, wherein the residue of the current video unit is obtained by subtracting the motion compensated block from the current video unit in a video.

3. The apparatus of claim 1, wherein the weighting factor is not equal to 1.

4. The apparatus of claim 1, wherein the processor is further configured to apply the weighting factor at a coding level selected from a group comprising: a sequence, a group of frames, frame, a group of slices, slice, a group of coding units (CUs), coding unit (CU), a group of prediction units (PUs), prediction unit (PU), blocks, and a region of pixels.

5. The apparatus of claim 1, wherein the weighting factor is determined based at least on weighting information.

6. The apparatus of claim 5, wherein the weighting information comprises one or more of a weighting step, a weighting table, a number of weighting factor candidates, and a weighting index.

7. The apparatus of claim 5, wherein the weighting information is signaled.

8. The apparatus of claim 7, wherein the weighting information is signaled at a coding level selected from a group comprising: a sequence, a group of frames, frame, a group of slices, slice, a group of coding units (CUs), coding unit (CU), a group of prediction units (PUs), prediction unit (PU), blocks, and a region of pixels.

9. The apparatus of claim 5, wherein a current block comprises the current video unit, and wherein a context model of weighting factor indices is based on at least one of a neighboring block above the current block or a neighboring block to the left of the current block.

10. The apparatus of claim 1, wherein a current block comprises the current video unit, and wherein the disparity vector is derived from a block neighboring the current block.

11. The apparatus of claim 1, wherein the disparity vector comprises one of a zero disparity vector or a global disparity vector.

12. The apparatus of claim 1, wherein the disparity vector is derived from a depth view component.

13. The apparatus of claim 1, wherein the processor is further configured to decode a residual value from a bitstream.

14. The apparatus of claim 1, wherein the processor is further configured to encode a residual value in a bitstream.

15. The apparatus of claim 1, wherein the apparatus is part of a device, the device selected from the group consisting of a desktop computer, a notebook computer, a tablet computer, a set-top box, a telephone handset, a television, a camera, a display device, a digital media player, a video gaming console, and a video streaming device.

16. A method of decoding video, the method comprising:
obtaining a video bitstream defining current view video information and reference view video information;

identifying a first reference block in a first time instance of a reference view using a disparity vector associated with a current video unit of a current view;

identifying a second reference block of the reference view in a second time instance distinct from the first time instance using the first reference block of the reference view and motion information associated with the current video unit of the current view;

determining a motion compensated block using motion information associated with the current video unit of the current view;

determining a residual predictor block based on a difference between the first and the second reference blocks multiplied by a weighting factor; and decoding the current video unit based at least on the motion compensated block and residual predictor block.

17. The method of claim 16, wherein decoding the current video unit comprises:
generating a reconstruction block of the current video unit by adding the motion compensated block and the residual predictor block to a decoded residue difference, the decoded residue difference obtained by applying an inverse transform and/or an inverse quantization to a residue difference residue received from the video bitstream.

18. The method of claim 16, wherein the weighting factor is not equal to 1.

19. The method of claim 16, further comprising applying the weighting factor at a coding level selected from a group comprising: a sequence, a group of frames, frame, a group of slices, slice, a group of coding units (CUs), coding unit (CU), a group of prediction units (PUs), prediction unit (PU), blocks, and a region of pixels.

20. The method of claim 16, wherein the weighting factor is determined based at least on weighting information.

21. The method of claim 20, wherein the weighting information comprises one or more of a weighting step, a weighting table, a number of weighting factor candidates, and a weighting index.

22. The method of claim 20, wherein the weighting information is signaled.

23. The method of claim 22, wherein the weighting information is signaled at a coding level selected from a group comprising: a sequence, a group of frames, frame, a group of slices, slice, a group of coding units (CUs), coding unit (CU), a group of prediction units (PUs), prediction unit (PU), blocks, and a region of pixels.

24. The method of claim 16, wherein a current block comprises the current video unit, and wherein a context model of weighting factor indices is based on at least one of a neighboring block above the current block or a neighboring block to the left of the current block.

25. The method of claim 16, wherein a current block comprises the current video unit, and wherein the disparity vector is derived from a block neighboring the current block.

26. The method of claim 16, wherein the disparity vector comprises one of a zero disparity vector or a global disparity vector.

27. The method of claim 16, wherein the disparity vector is derived from a depth view component.

28. A method of encoding video, the method comprising:
generating a video bitstream defining current view video information and reference view video information;

identifying a first reference block in a first time instance of a reference view using a disparity vector associated with a current video unit of a current view;

identifying a second reference block of the reference view in a second time instance distinct the first time instance using the first reference block of the reference view and motion information associated with the current video unit of the current view;

determining a motion compensated block using the motion information associated with the current video unit of the current view;

determining a residual predictor block based on a difference between the first and the second reference blocks multiplied by a weighting factor; and encoding the current video unit based at least on the residual predictor block and the motion compensated block.

29. The method of claim 28, further comprising:
encoding in the bit stream a residue difference obtained by subtracting the residual predictor block from a residue of the current video unit, wherein the residue of the current video unit is obtained by subtracting the motion compensated block from the current video unit.

30. The method of claim 28, wherein the weighting factor is not equal to 1.

31. The method of claim 28, further comprising applying the weighting factor at a coding level selected from a group comprising: a sequence, a group of frames, frame, a group of slices, slice, a group of coding units (CUs), coding unit (CU), a group of prediction units (PUs), prediction unit (PU), blocks, and a region of pixels.

32. The method of claim 28, wherein the weighting factor is determined based at least on weighting information.

33. The method of claim 32, wherein the weighting information comprises one or more of a weighting step, a weighting table, a number of weighting factor candidates, and a weighting index.

34. The method of claim 32, wherein the weighting information is signaled.

35. The method of claim 34, wherein the weighting information is signaled at a coding level selected from a group comprising: a sequence, a group of frames, frame, a group of slices, slice, a group of coding units (CUs), coding unit (CU), a group of prediction units (PUs), prediction unit (PU), blocks, and a region of pixels.

36. The method of claim 28, wherein a current block comprises the current video unit, and wherein a context model of weighting factor indices is based on at least one of a neighboring block above the current block or a neighboring block to the left of the current block.

37. The method of claim 28, wherein a current block comprises the current video unit, and wherein the disparity vector is derived from a block neighboring the current block.

38. The method of claim 28, wherein the disparity vector comprises one of a zero disparity vector or a global disparity vector.

39. The method of claim 28, wherein the disparity vector is derived from a depth view component.

40. A non-transitory computer readable storage medium comprising instructions executable by a processor of an apparatus, the instructions causing the apparatus to:

obtain current view video information and reference view video information;

identify a first reference block in a first time instance of a reference view using a disparity vector associated with a current video unit of a current view;

identify a second reference block of the reference view in a second time instance distinct from the first time instance using the first reference block of the reference view and motion information associated with the current video unit of the current view;

determine a motion compensated block using the motion information associated with the current video unit of the current view;

determine a residual predictor block based on a difference between the second reference block and the first reference block multiplied by a weighting factor; and code the current video unit based at least on the motion compensated block and the residual predictor block.

41. The non-transitory computer readable storage medium of claim 40, the instructions further causing the apparatus to:
encode a residue difference obtained by subtracting the residual predictor block from a residue of the current video unit, wherein the residue of the current video unit is obtained by subtracting the motion compensated block from the current video unit in a video bitstream.

42. An apparatus for coding digital video, the apparatus comprising:

means for obtaining current view video information and reference view video information;

means for identifying a first reference block of a reference view in a first time instance using a disparity vector associated with a current video unit of a current view;

means for identifying a second reference block of the reference view in a second time instance distinct from the first time instance using the first reference block of the reference view and motion information associated with the current video unit of the current view;

means for determining a motion compensated block using the motion information associated with the current video unit of the current view;

means for determining residual predictor block based on a difference between the second reference block and the first reference block multiplied by a weighting factor; and means for coding the current video unit based at least on the motion compensated block and the residual predictor block.

43. The apparatus of claim 42, further comprising:
means for encoding a residue difference obtained by subtracting the residual predictor block from a residue of the current video unit, wherein the residue of the current video unit is obtained by subtracting the motion compensated block from the current video unit in a video bitstream.

* * * * *